US012548907B2

(12) United States Patent
Abu Suheil et al.

(10) Patent No.: US 12,548,907 B2
(45) Date of Patent: Feb. 10, 2026

(54) ANTENNA, ESPECIALLY UWB ANTENNA, FOR CIRCULARLY POLARIZED RADIO WAVES

(71) Applicant: Hella GmbH & Co. KGaA, Lippstadt (DE)

(72) Inventors: Belal Abu Suheil, Lippstadt (DE); Michael Mehn, Ruethen (DE); Muhammad Fawad Panhwar, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 105 days.

(21) Appl. No.: 18/540,328

(22) Filed: Dec. 14, 2023

(65) Prior Publication Data

US 2024/0128647 A1 Apr. 18, 2024

Related U.S. Application Data

(63) Continuation of application No. PCT/EP2021/066393, filed on Jun. 17, 2021.

(51) Int. Cl.
*H01Q 1/38* (2006.01)
*H01Q 9/04* (2006.01)
*H01Q 5/25* (2015.01)

(52) U.S. Cl.
CPC ............. *H01Q 9/0428* (2013.01); *H01Q 5/25* (2015.01)

(58) Field of Classification Search
CPC .. H01Q 1/38; H01Q 5/25; H01Q 9/04; H01Q 9/0414; H01Q 9/0428; H01Q 9/0464
See application file for complete search history.

(56) References Cited

U.S. PATENT DOCUMENTS 7,609,222 B2 * 10/2009 Schneider .............. H01Q 5/328 343/834
7,741,999 B2 * 6/2010 Mierke ................ H01Q 9/0414 343/700 MS
9,761,935 B2 * 9/2017 Ross, III .................. H01Q 1/36
(Continued)

OTHER PUBLICATIONS

Haraz Om et al: "Band rejection capabilities of UWB elliptical slot antenna with half circular and crescent Ring Shaped Radiators", Antennas and Propagation Society International Symposium (APSURSI), 2010 IEEE, IEEE, Piscataway, NJ, USA, Jul. 11, 2010 (Jul. 11, 2010), pp. 1-4.
(Continued)

*Primary Examiner* — Tho G Phan
(74) *Attorney, Agent, or Firm* — Husch Blackwell LLP

(57) ABSTRACT

An antenna includes a plate of an electrically insulating material having a first and a second side. In an outer layer on the first side, there is a crescent-shaped first patch of an electrically conductive material having a first edge extending at a first radius and a second edge extending at a second, smaller radius. A perforated second patch of an electrically conductive material is provided in an outer layer on the second side which has four straight outer edges and a center hole with a third radius. The first patch lies within or almost entirely within the hole in the second patch in a projection perpendicular to the plate. Each of the outer edges of the second patch is connected by circular-arc outer edge to two adjacent outer edges, each of the circular-arc outer edge extending over an angle of 90° with a fourth radius.

6 Claims, 1 Drawing Sheet

(56) References Cited

U.S. PATENT DOCUMENTS 10,615,496 B1 * 4/2020 Zeppettella .............. H01Q 3/01
2014/0361952 A1 12/2014 Dobric et al.

OTHER PUBLICATIONS

Elavarasi C et al: "SRR loaded crescent patch-koch curve fractal for dual band applications", 2016 International Conference on Control, Instrumentation, Communication and Computational Technologies (ICCICCT), IEEE, Dec. 16, 2016 (Dec. 16, 2016), pp. 263-267.
Chen M-E et al: "CPW-fed crescent patch antenna for UWB applications", Electronic Letters, The Institution of Engineering and Technology, vol. 44, No. 10, May 8, 2008 (May 8, 2008), pp. 613-615.

* cited by examiner

ANTENNA, ESPECIALLY UWB ANTENNA, FOR CIRCULARLY POLARIZED RADIO WAVES

CROSS REFERENCE

This application claims priority to PCT Application No. PCT/EP2021/066393, filed Jun. 17, 2021, the entirety of which is hereby incorporated by reference.

FIELD OF THE INVENTION

The invention relates to a UWB antenna for circularly polarized radio waves, wherein the antenna comprises a plate of an electrically insulating material having a first side and a second side, wherein in an outer layer on the first side there is provided a crescent-shaped first patch of an electrically conductive material having a first edge and a second edge, the first edge extending in a first radius and the second edge extending in a second radius smaller than the first radius, wherein a perforated second patch of an electrically conductive material enclosing a round circular slot is provided in an outer layer on the second side, having four straight outer edges and having a third radius hole located in a center of the patch, and wherein the first patch lies within or almost entirely within the hole in the second patch in a projection perpendicular to the plate.

BACKGROUND OF THE INVENTION

It is known to use UWB transceivers in vehicles. In particular, UWB technology is known to be used to control vehicle access. In addition, UWB interfaces are integrated in many smartphones. This makes it possible for the vehicle to communicate with a smartphone, which can be used to control vehicle access.

So far, however, UWB antennas that generate linearly polarized waves have been used. However, this sometimes results in poor communication with the smartphone if it is not aligned with the direction of the linearly polarized radio waves.

Furthermore, circularly polarized antennas, especially UWB antennas, are known that can be used to generate and transmit circularly polarized radio waves. Md. Samsuzzaman and Mohammad Tariqul Islam "Circularly Polarized Broadband Printed Antenna for Wireless Applications" describe in Sensors 2018, 18, 4261; www.mdpi.com/journal/sensors a printed circuit board forming such a UWB antenna for generating circularly polarized radio waves as mentioned at the beginning. This antenna may be part of a UWB transceiver in the vehicle. The use of circularly polarized radio waves leads to better communication, in particular better reception of the radio waves transmitted by the vehicle in the smartphone regardless of the orientation of the smartphone in space.

However, in order to achieve better results in the communication between a UWB antenna in a smartphone and a UWB transceiver with a circularly polarized UWB antenna in the vehicle, some improvements are desirable that can also be used for other circularly polarized antennas. In particular, the far-field radiation pattern should be optimized. This can be achieved if the far-field radiation pattern has no or almost no areas, so-called blind spots, which are not reached by the waves. The far-field radiation pattern is a circle when viewed in two dimensions and a sphere when viewed in three dimensions.

It has been shown that the far-field radiation pattern can be improved by connecting each of the straight outer edges of the second patch by circular-arc outer edge to two adjacent ones of these straight outer edges, each of the circular-arc outer edges extending over an angle of 90°. Unlike the UWB antenna known from said attachment, the outer contour of the second patch is not a rectangle. Rather, instead of the corners of the rectangle, the circular arc-shaped outer edges are provided. As a result, the input reflection factor of an antenna according to the invention is significantly better than that of the known antenna, especially in a higher frequency range. If the far-field radiation characteristic of an antenna according to the invention is considered in the two-dimensional range in the higher frequency range, it is more circular than that of the known antenna. It has even been shown that the larger the radius of the circular arc-shaped outer edges, the more circular it is.

BRIEF SUMMARY OF THE INVENTION

In an antenna according to the invention, a third and a fourth rectangular patch of an electrically conductive material may be provided in the outer layer on the first side of the plate. A conductive path may be provided in the outer layer on the first side of the plate as a coplanar line connected to the first patch. The connection to the first patch may be made via a portion of the coplanar line that has parallel edges. Unlike the antenna known from the cited article, the connection is geometrically simple and an extension of the coplanar line. In the known antenna, the connection was instead designed to taper toward the first patch.

The coplanar line of an antenna according to the invention may be straight that means it has a constant width. The coplanar line may extend between the third patch and the fourth patch.

In the outer layer, a fifth rectangular patch of an electrically conductive material may be provided on the second side of the plate. This fifth patch may be provided in an area which, in a projection perpendicular to the plate, is in the same area where the third and fourth patches and the coplanar lead are provided.

A sixth rectangular patch of an electrically conductive material may be provided in an inner layer on the first side of the plate, which is disposed between the plate and the outer layer on the first side of the plate. A seventh, rectangular patch of an electrically conductive material may be provided in an inner layer on the second side of the plate disposed between the plate and the outer layer on the second side of the plate. Both the sixth and seventh patches may be located in a projection perpendicular to the plate in a same region of the plate as the fifth patch. The third, fourth, fifth, sixth and/or seventh patches may form a ground of the antenna. For this purpose, these patches may be interconnected, for example, via vias.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
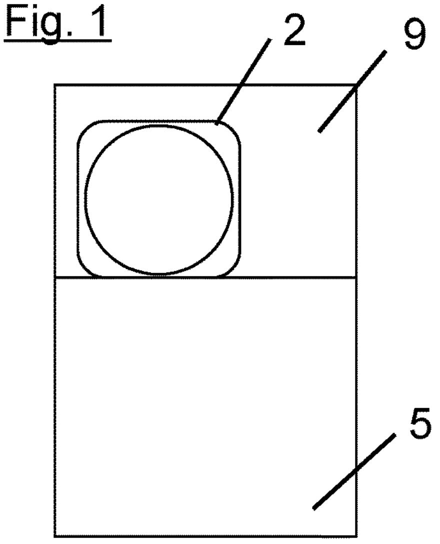
FIG. 1 shows the antenna in a view from below.
Figure 2:
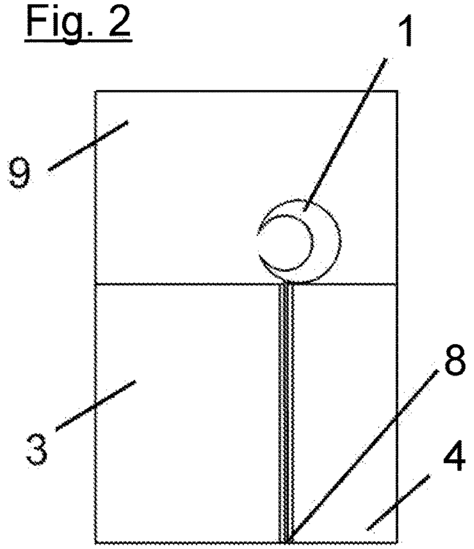
FIG. 2 shows the antenna in a top view.
Figure 3:
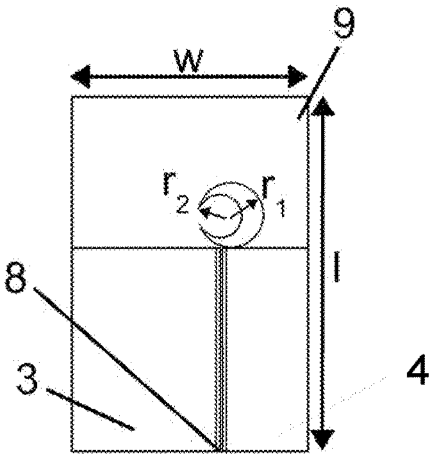
FIG. 3 is a view of an outer layer on a first side of a plate of the antenna in a top view.
Figure 4:
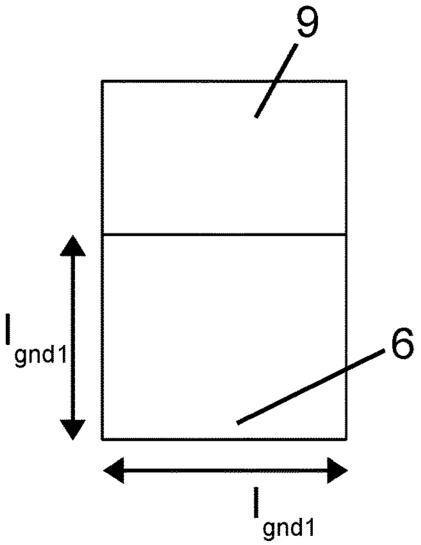
FIG. 4 is a view of an inner layer on a first side of the plate of the antenna in a top view.
Figure 5:
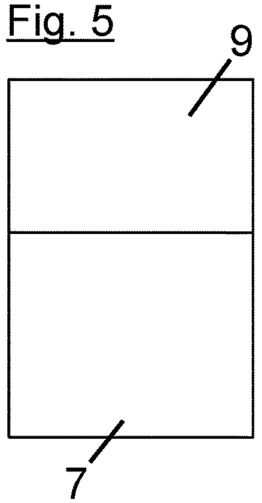
FIG. 5 is a view of an inner layer on a second side of a plate of the antenna in a top view.
Figure 6:
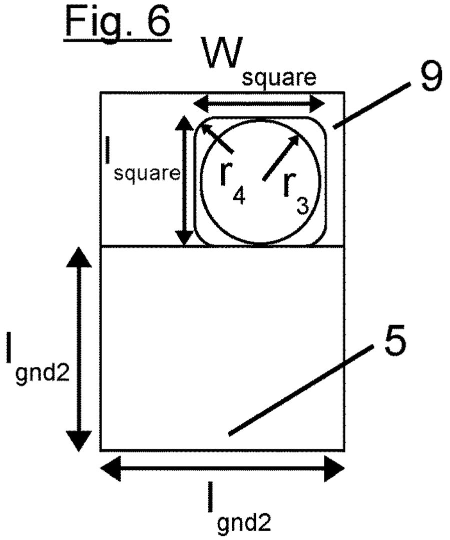
FIG. 6 is a view of an outer layer on the second side of a plate of the antenna in a top view.

The antenna according to the invention shown in the figures has a plate 9 made of an electrically non-conductive material as a support. Two layers are provided on each of the two sides of this plate 9. These layers have areas of electrically conductive material, hereinafter referred to as patches 1, 2, 3, 4, 5, 6, 7. Furthermore, in one of the layers a coplanar line 8 is provided, which is embedded between two patches 3, 4.

In an outer layer on a first side of the plate, a first crescent-shaped patch 1 is provided. This has a first circular arc-shaped edge with a radius r1 and a second circular arc-shaped edge with radius r2. The—this first patch 1 is connected to the coplanar line 8 in the same layer. The coplanar line 8 has parallel edges and runs rectilinearly in the outer layer on the first side of the plate 9, being embedded between two other patches 3, 4, a third 3 and a fourth patch 4, which are rectangular.

In an inner layer on the first side of the plate 9, sixth patch 6 is provided. This sixth patch 6 covers approximately the area covered in the outer layer by the coplanar line 8 and the third and fourth patches 3, 4. It has a length lgnd1 and a width that is the same.

A seventh patch 7 of an electrically conductive material is provided in an inner layer on the second side of the plate 9. This seventh patch 7 covers approximately the area which is covered in the outer layer by the coplanar line 8 and the third and fourth patches 3, 4 and which is covered in the inner layer on the first side of the plate 9 by the sixth patch 6. Compared to the third, fourth and sixth patches, the seventh patch 7 has a length lgnd2.

This inner layer is followed by an outer layer on the second side of plate 9. In this outer layer, a fifth, rectangular patch 5 made of an electrically conductive material is provided. This patch covers the same area as the seventh patch 7. A second patch 2 of an electrically conductive material is also provided in this outer layer. This second patch 2 forms a frame which encloses a circular cutout with a radius r3. The outer surface has four straight outer edges which oppose each other in pairs and which lie on the sides of a rectangle of length lsquare and width wsquare. Each of these outer straight edges is connected to the adjacent outer circular arc-shaped edge by a circular arc-shaped outer edge. The radius of this circular arc-shaped edge is denoted by r4. The radius is the same for all circular arc-shaped edges.

The third, fourth, fifth, sixth and seventh patches 3, 4, 5, 6, 7 are connected to each other by through-connections. These patches 3, 4, 5, 6, 7 and also the second patch 2 form a ground of the antenna. The signal is conducted via the coplanar line 8 to the first patch 1, from which (1) it is transmitted to the free field.

LIST OF REFERENCE SIGNS

1 first patch
2 second patch
3 third patch
4 fourth patch
5 fifth patch
6 sixth patch
7 seventh patch
8 coplanar line
9 plate

We claim:

1. An antenna for circularly polarized radio waves, the antenna comprising:

a plate of an electrically insulating material having a first and a second side;

a crescent-shaped first patch of an electrically conductive material in an outer layer on the first side, the crescent-shaped first patch having a first edge and a second edge, the first edge extending in a first radius (r1) and the second edge extending in a second radius (r2) which is smaller than the first radius (r1);

a second patch of an electrically conductive material enclosing a round circular slot in an outer layer on the second side, the second patch having four straight outer edges and a hole with a third radius (r3) located in a center of the second patch (2); and a coplanar line positioned on the outer layer on the first side of the plate and in contact with the crescent-shaped first patch, the coplanar line having a constant width, wherein the first patch in a projection perpendicular to the plate lies within or almost entirely within the hole in the second patch;

wherein each of the straight outer edges of the second patch is connected by arcuate outer edges to two adjacent ones of said arcuate outer edges, each of said arcuate outer edges extending over an angle of 90° and having a fourth radius (r4).

2. The antenna according to claim 1, wherein a third and a fourth rectangular patch of an electrically conductive material are provided in the outer layer on the first side of the plate.

3. The antenna according to claim 1, wherein the coplanar line runs between a third and a fourth rectangular patch of an electrically conductive material in the outer layer on the first side of the plate.

4. The antenna according to claim 3, further including a fifth rectangular patch of an electrically conductive material in the outer layer on the second side of the plate, wherein in a projection perpendicular to the plate the third patch, the fourth patch and the coplanar line lie in an approximately equal area of the plate as the fifth patch.

5. The antenna according to claim 4, further including a sixth rectangular patch of an electrically conductive material in an inner layer on the first side of the plate, which is arranged between the plate and the outer layer on the first side of the plate, the sixth patch lying in a projection perpendicular to the plate in an approximately same area of the plate as the fifth patch.

6. The antenna according to claim 5, wherein in an inner layer on the second side of the plate, which is arranged between the plate and the outer layer on the second side of the plate, a seventh, rectangular patch of an electrically conductive material is provided, the seventh patch lying in a projection perpendicular to the plate in approximately the same area of the plate as the fifth patch.

* * * * *